United States Patent [19]
Hanyu et al.

[11] Patent Number: 5,825,447
[45] Date of Patent: Oct. 20, 1998

[54] LIQUID CRYSTAL DEVICE WITH A BISTABLE CHIRAL SMECTIC LIQUID CRYSTAL HAVING A PHASE TRANSITION SERIES LACKING A CHOLESTERIC PHASE #16

[75] Inventors: Yukio Hanyu, Isehara; Katsutoshi Nakamura, Hiratasuka; Nobuhiro Ito, Sagamihara, all of Japan

[73] Assignee: Canon Kabushiki Kaisha, Tokyo, Japan

[21] Appl. No.: 666,916

[22] Filed: Jun. 19, 1996

Related U.S. Application Data

[63] Continuation of Ser. No. 283,141, Aug. 1, 1994, abandoned.

[30] Foreign Application Priority Data

Aug. 3, 1993 [JP] Japan ..................................... 5-212264
Aug. 3, 1993 [JP] Japan ..................................... 5-212265

[51] Int. Cl.⁶ ........................ G02F 1/1337; G02F 1/141; C09K 19/02; C09K 19/52
[52] U.S. Cl. ........................ 349/128; 349/133; 349/135; 349/172; 252/299.01
[58] Field of Search ................................ 359/90, 100, 75, 359/76, 78, 99; 252/299.01; 349/128, 133, 134, 135, 172, 184

[56] References Cited

U.S. PATENT DOCUMENTS

| | | | |
|---|---|---|---|
| 4,367,924 | 1/1983 | Clark et al. ................................. | 359/56 |
| 4,563,059 | 1/1986 | Clark et al. ................................. | 359/76 |
| 4,596,667 | 6/1986 | Inukai et al. ........................ | 252/299.65 |
| 4,799,776 | 1/1989 | Yamazaki et al. ........................ | 359/75 |
| 4,813,767 | 3/1989 | Clark et al. ................................. | 359/76 |
| 4,840,463 | 6/1989 | Clark et al. ................................. | 359/43 |
| 5,417,883 | 5/1995 | Epstein et al. ........................... | 359/100 |

FOREIGN PATENT DOCUMENTS

| | | |
|---|---|---|
| 0322703 | 7/1989 | European Pat. Off. . |
| 56-107216 | 8/1981 | Japan . |
| 2174820 | 11/1986 | United Kingdom . |

OTHER PUBLICATIONS

Liquid Crystals–Fundamentals & Applications (1991) 78–81.
Clark et al., Japan Display (1986) pp. 456–458. No Month.
Ouchi et al., J. Journal Appl. Phys., vol. 27, No. 5 (1988) pp. L725–728. No Month.
Research Disclosure, vol. 345 (Jan. 1993) 2244.
Japanese Journal of Appl. Physics, vol. 29(2), No. 6 (Jun. 1990) 984–986.
Japanese Journal of Appl. Physics, vol. 29(1), No. 9 (Sep. 1990) 1757–64.
Mol. Cryst and Liq. Cryst. Bulletin, vol. 202 (Jul. 1991) 85–90.
Japanese Journal of Appl. Physics, vol. 29, No. 6 (Jun. 1990) 987–990.
J. Phys. D: Appl. Phys., vol. 19 (1986) L37–L41. No Month.
Japanese Journal of Appl. Physics, vol. 27, No. 5 (May 1988) 725–728.

*Primary Examiner*—William L. Sikes
*Assistant Examiner*—Walter Malinowski
*Attorney, Agent, or Firm*—Fitzpatrick, Cella, Harper & Scinto

[57] ABSTRACT

A chiral smectic liquid crystal device with good planar homogeneity in a layer normal direction can be constituted by disposing a chiral smectic liquid crystal having no cholesteric phase between a pair of substrates having mutually different characters, particularly in terms of Iso-SmA phase transition temperature. The liquid crystal may preferably have a layer spacing-changing characteristic such that it provides a layer spacing $d_A$ at a first transition point where the layer spacing of the liquid crystal begins to decrease on temperature decrease in the vicinity of a transition temperature from SmA phase to SmC* phase and a layer spacing $d_{min}$ at a second transition point where the layer spacing of the liquid crystal begins to increase on further temperature decrease from the first transition point, satisfying $0.96 \leq d_{min}/d_A$.

14 Claims, 7 Drawing Sheets

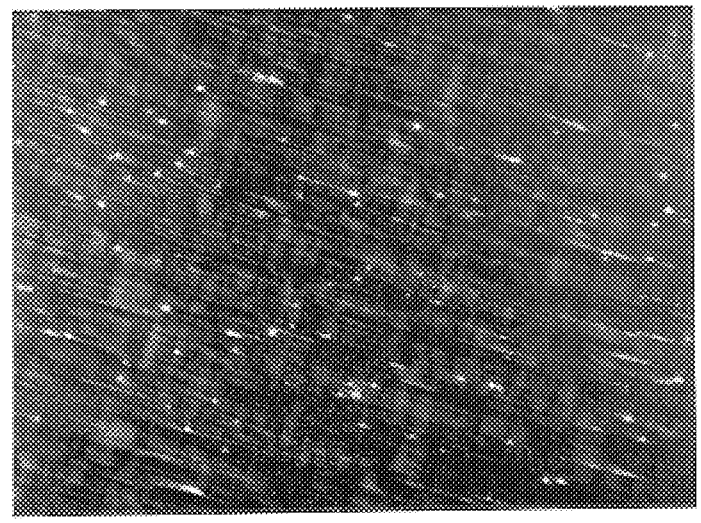
F I G. 4
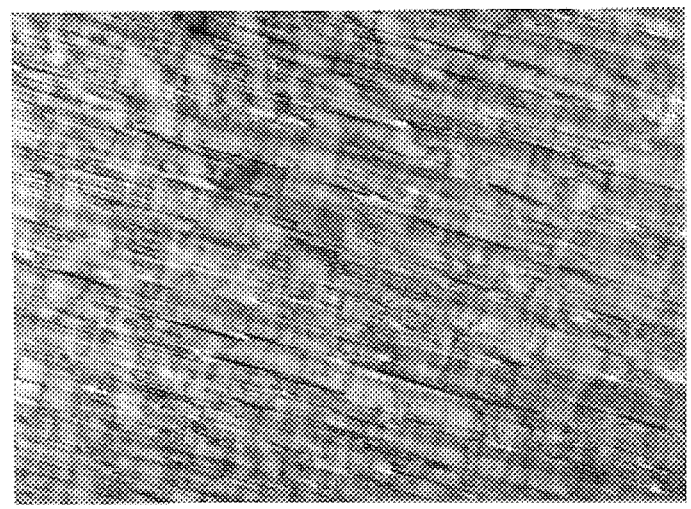
F I G. 5

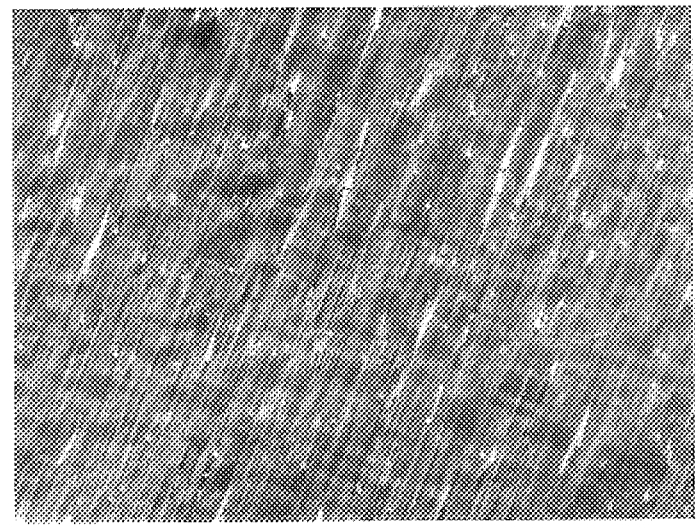
F I G. 6
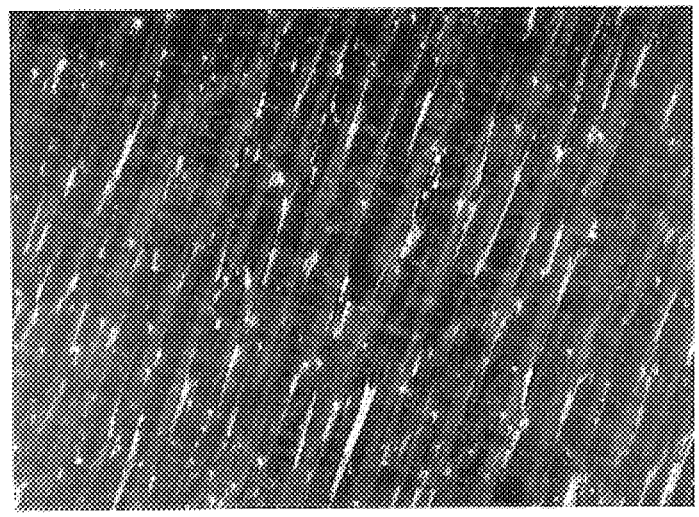
F I G. 7

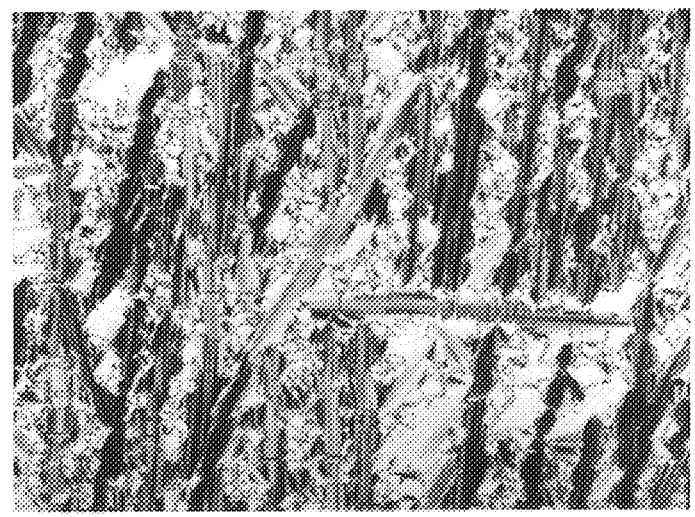
F I G. 10
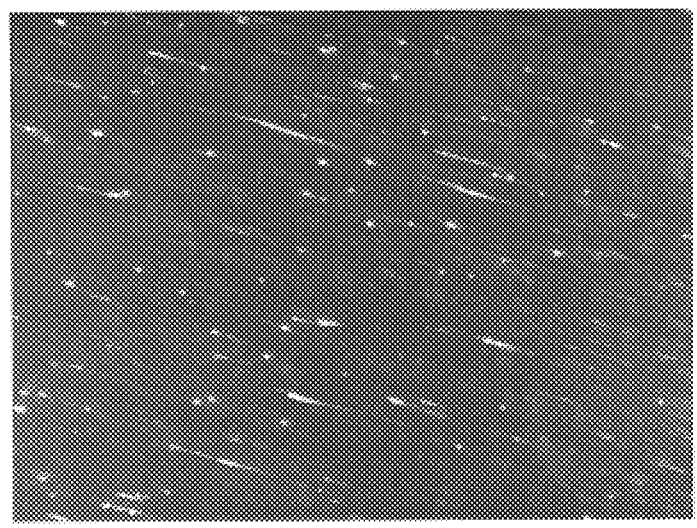
F I G. 11

LIQUID CRYSTAL DEVICE WITH A BISTABLE CHIRAL SMECTIC LIQUID CRYSTAL HAVING A PHASE TRANSITION SERIES LACKING A CHOLESTERIC PHASE

16

This application is a continuation of application Ser. No. 08/283,141, filed Aug. 1, 1994, now abandoned.

FIELD OF THE INVENTION AND RELATED ART

The present invention relates to a liquid crystal device, particularly a chiral smectic liquid crystal device, suitable for use in a liquid crystal display device, a liquid crystal shutter, etc. More specifically, the present invention relates to a chiral smectic liquid crystal device having improved display characteristics and drive characteristics through an improvement in alignment state of liquid crystal molecules.

A display device of the type which controls transmission of light in combination with a polarizing device by utilizing the refractive index anisotropy of ferroelectric liquid crystal molecules, has been proposed by Clark and Lagerwall (Japanese Laid-Open Patent Application (JP-A) 56-107216, U.S. Pat. No. 4,367,924, etc.). The ferroelectric liquid crystal has generally chiral smectic C phase (SmC*) or H phase (SmH*) of a non-helical structure in a specific temperature range and, in the SmC* or SmH* phase, shows a property of assuming either one of a first optically stable state and a second optically stable state responding to an electrical field applied thereto and maintaining such a state in the absence of an electrical field, namely bistability, and also has a quick responsiveness to the change in electric field. Thus, it is expected to be widely utilized in a high speed and memory type display device and particularly to provide a large-area, high-resolution display according to a simple matrix drive scheme in view of its function.

For an optical modulating device using a ferroelectric liquid crystal having such bistability to exhibit desirable driving characteristics, it is required that the liquid crystal disposed between a pair of substrates should be in such a molecular alignment state that switching between the above two stable states may occur effectively irrespective of the application of an electrical field.

[Realization of homogeneity in direction of smectic layer normals and uniform alignment]

As a result of X-ray diffraction analysis, it has been confirmed that the actual layer structure of a smectic liquid crystal in a device is not an initially expected bookshelf layer structure wherein smectic layers are aligned substantially perpendicularly to the substrates without bending of the layers but is a chevron layer structure wherein the layers are bent in the form of a chevron between the substrates because of a decrease in smectic layer thickness (generally called "layer spacing" in the art) accompanying a transition from the SmA phase to the SmC* phase. In the chevron layer structure, the following relationship representing a uniform alignment:

$$\textcircled{H} > \theta a > /2$$

between an apparent tilt angle θa and a tilt angle $\textcircled{H}$, cannot be satisfied unless the pretilt angle a is substantially equal to the layer inclination angle δ.

According to out study, however, it has been empirically known difficult to obtain a device showing a large apparent tilt angle in the case of a chevron structure. In order to obtain a smectic liquid crystal device showing larger brightness and contrast, it has been found necessary to minimize the temperature-dependent change in a smectic layer structure and retain the layers in an upright state (i.e., minimize the layer inclination). In other words, it is difficult to provide a conventional type of smectic liquid crystal device with a uniform alignment showing a higher contrast while retaining the chevron structure.

Further, the contrast of a smectic liquid crystal is largely affected by the homogeneity of alignment in direction of smectic layer normals over the planar extension of the device, and the suppression of a transmitted light quantity in the dark state is another important factor.

Accordingly, in order to obtain a smectic layer structure generally called a bookshelf layer structure, we have tried to use a liquid crystal material having a phase transition series not including cholesteric (Ch) phase.

However, in a device using a conventional smectic liquid crystal having no Ch phase, e.g., one having a phase transition series of Iso-SmA-SmC*, it has been found that the planar homogeneity in the layer normal direction is liable to be collapsed at the time of generation of batonnets in the course of cooling from the isotropic (Iso) phase to SmA phase under no electric field.

Further, in a liquid crystal device using a conventional liquid crystal having no cholesteric phase, some improvement regarding a problem of "standing monostability" as described below has to be given.

[Standing monostability]

The above-mentioned "bistability" is an excellent characteristic of a chiral smectic liquid crystal. In a device of causing switching between different stable states by utilizing the characteristic, however, the drive characteristics thereof can be remarkably degraded by fluctuation of thresholds for switching between the two stable states. As a major factor causing the threshold fluctuation, there has been known a phenomenon of "surface memory", because of which the drive characteristics of a conventional chiral smectic liquid crystal device are liable to be impaired thus resulting in an inferior reliability. The surface memory is caused by leaving the liquid crystal to stand for a long term in one stable state of the liquid crystal, so that the characteristic is referred to as "standing monostability" (i.e., monostability due to standing).

SUMMARY OF THE INVENTION

In view of the above-mentioned problems, an object of the present invention is to provide a liquid crystal device with excellent device characteristics and drive characteristics.

Another object of the present invention is to provide a liquid crystal device with a high contrast and with few alignment defects.

Another object of the present invention is to provide a liquid crystal device which has a high contrast and is less liable to cause the surface memory.

Another object of the present invention is to provide a liquid crystal device which is less liable to cause an irregularity in liquid crystal layer thickness between the substrates due to movement of liquid crystal molecules.

According to a generic aspect of the present invention, there is provided a liquid crystal device, comprising a pair of substrates and a liquid crystal disposed therebetween; wherein the liquid crystal has a phase transition series not showing cholesteric phase, and the pair of substrates have been subjected to asymmetrical aligning treatments.

According to a more specific aspect of the present invention, there is provided a liquid crystal device, comprising a pair of substrates each having thereon a transparent electrode, and a liquid crystal disposed between the substrates, wherein the liquid crystal does not have cholesteric phase and has a layer spacing-changing characteristic such that it provides a layer spacing $d_A$ at a first transition point where the layer spacing of the liquid crystal begins to decrease on temperature decrease in the vicinity of a transition temperature from SmA phase to SmC* phase and a layer spacing $d_{min}$ at a second transition point where the layer spacing of the liquid crystal begins to increase on further temperature decrease from the first transition point, satisfying $0.96 \leq d_{min}/d_A$, and the pair of substrates are provided with means for providing different Iso-SmA phase transition temperatures at their boundaries with the liquid crystal.

According to another aspect of the present invention, there is provided a liquid crystal device, comprising a pair of substrates each having thereon a transparent electrode, and a liquid crystal disposed between the substrates, wherein the liquid crystal does not have cholesteric phase and has a layer spacing-changing characteristic such that it provides a layer spacing $d_A$ at a first transition point where the layer spacing of the liquid crystal begins to decrease on temperature decrease in the vicinity of a transition temperature from SmA phase to SmC* phase and a layer spacing $d_{min}$ at a second transition point where the layer spacing of the liquid crystal begins to increase on further temperature decrease from the first transition point, satisfying $0.96 \leq d_{min}/d_A$, and either one of the pair of substrates is provided with an alignment film for uniaxially aligning the liquid crystal, the alignment film having a glass transition point of at least 200° C. or comprising a polyimide.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 through 8 are polarizing microscopic photographs (×250) showing crystalline textures of chiral smectic liquid crystals in Experimental Examples 4–8, respectively.

FIGS. 9 through 11 are polarizing microscopic photographs (×250) showing crystal textures of chiral smectic liquid crystals in Comparative Examples 2–4, respectively.

DESCRIPTION OF THE PREFERRED EMBODIMENTS

A liquid crystal device according to a preferred embodiment may be prepared by using a liquid crystal material having a phase transition series not showing Ch phase (hereinafter referred to as "Ch-free liquid crystal" and providing to the pair of substrates with different aligning treatments thereby providing different Iso-SmA phase transition temperatures at their boundaries. In a device using a Ch-free liquid crystal described above, a pair of substrates subjected to identical aligning treatments were used, whereby there occurred alignment defects and the planar homogeneity in direction of smectic layer normals was not good. However, in the case where a Ch-free liquid crystal was incorporated in a device comprising a pair of substrates subjected to different aligning treatments, the planar homogeneity in smectic layer normal direction was improved.

In another preferred embodiment of the present invention, the planar homogeneity in smectic layer normal direction of a liquid crystal device using a Ch-free liquid crystal is improved by using an alignment film comprising a material having a glass transition point of at least 200° C.

The pair of substrates constituting the liquid crystal device according to the present invention includes at least one transparent substrate and may comprise at least one material selected from glass, polymers, quartz, silicon and aluminum, which may be an insulating material, a semiconductor or a metal.

The alignment film used in the present invention may comprise a film of an organic polymer, such as polyimide, polyamide, or polyvinyl alcohol; or a film of an inorganic material, such as silicon oxide, silicon nitride, or TiSi. These films may preferably be subjected to a uniaxial aligning treatment such as rubbing or oblique vapor deposition.

The selection of the alignment film material and/or aligning treatment may be performed as desired in the respective embodiments of the present invention.

In a preferred embodiment including a simplest production step, a pair of substrates may respectively be coated with films of polyimide having a glass transition point of at least 200° C., and one of the films is subjected to rubbing.

In another preferred embodiment, a liquid crystal device may comprise a pair of substrates including one having a uniaxial alignment as described above and the other comprising an alignment film which has not been subjected to rubbing and has a property of providing a random alignment of liquid crystal molecules in contact therewith.

In the present invention, it is further preferred to use not a mere Ch-free liquid crystal but a Ch-free liquid crystal having a specific temperature-dependence of smectic layer spacing, whereby a bookshelf structure having a remarkably improved planar homogeneity in smectic layer normal direction.

Figure 2:
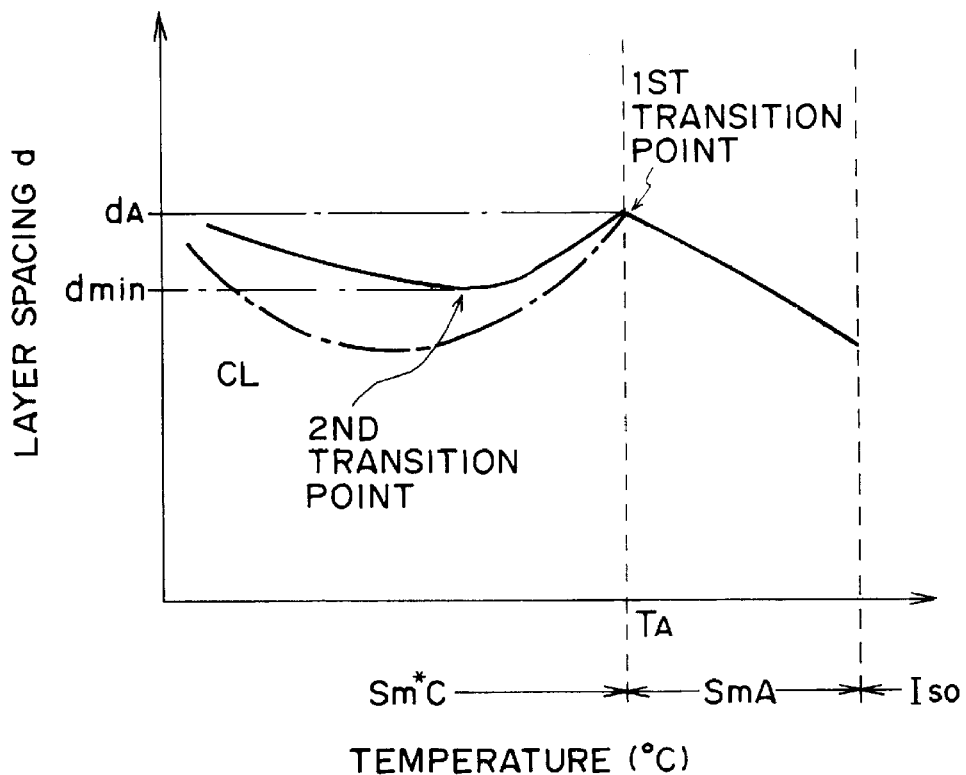
FIG 2. is a graph showing a temperature-dependence of the layer spacing (smectic layer thickness) of a liquid crystal composition used in the invention.

FIG. 2 is a graph showing a relationship between smectic layer spacing (i.e., smectic layer thickness) and temperature of such a liquid crystal showing a specific temperature-dependent layer spacing-changing characteristic.

In FIG. 2, the abscissa represents the temperature and the ordinate represents the liquid layer spacing. Referring to FIG. 2, $d_A$ denotes a maximum value of layer spacing at a temperature (first transition point) where the layer spacing of a liquid crystal begins to decrease on temperature decrease in the vicinity of a phase transition temperature $T_A$ from SmA phase to SmC* phase, and $d_{min}$ denotes a minimum value of layer spacing at a temperature (second transition point) where the layer spacing of the liquid crystal begins to increase on further temperature decrease in the temperature range of SmC*.

In the Ch-free liquid crystal used in the present invention, it is possible to control the layer spacing values $d_A$ and $d_{min}$ by appropriately selecting the species and relative amounts of mesomorphic compounds constituting the liquid crystal. The details thereof will be more specifically described in Examples appearing hereinafter.

In the Examples, the layer spacings $d_A$ and $d_{min}$ were controlled so as to satisfy a relationship of $0.96 \leq d_{min}/d_A$, more preferably $0.99 \leq d_{min}/d_A$, by using a prescribed amount of the following mesomorphic compound having a silicone dimer skeleton:

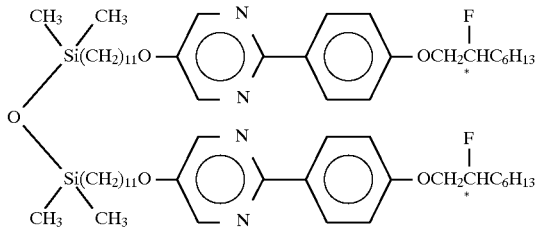

Referring to FIG. 2, if the liquid crystal is caused to have a smaller $d_{min}/d_A$ of, e.g., below 0.90, as represented by a dot-and-dash line CL, the liquid crystal is liable to cause defects at the time of transition from SmA to SmC *.

In this way, a liquid crystal composition containing a chiral dopant having a siloxane dimer skeleton is capable of controlling the smectic layer spacing-changing characteristic (temperature-dependence) and may be a preferred example of liquid crystal material for providing a liquid crystal device having a bookshelf layer structure and providing a high contrast. Further details of such a dimer-type mesomorphic compound are available in European Patent Publication EP-A-0322703, incorporated herein by reference.

According to our study, it has been found effective to start the Iso-SmA phase transition from either one of the boundaries at the pair of substrates by homogeneously aligning the above-mentioned liquid crystal to obtain a uniform alignment. As the spacing between a pair of substrates for a chiral smectic liquid crystal device is on the order of 1–2 μm, it is generally difficult to provide an effective temperature gradient for such a homogenous alignment from one side of the substrates. In contrast thereto, we have utilized a phenomenon that a certain liquid crystal material can show a phase transition temperature in a liquid crystal device subjected to an aligning treatment which is different from the phase transition temperature of the liquid crystal material in its bulk phase depending on the state of the surface subjected to the aligning treatment. More specifically, by subjecting a pair of substrates to asymmetrical aligning treatments (i.e., different conditions of aligning treatments), it has become possible to provide an effective difference in Iso-SmA phase transition temperature between the boundaries at a pair of substrates.

In the present invention, it is desirable to provide asymmetrical pretilt angles at the inner surfaces of the pair of substrates. Further, in order to stably realize a homogeneous alignment without being substantially affected by a gradual cooling rate, it is desirable to provide a difference of at least 0.5° C. in the above-described Iso-SmA phase transition temperature.

Figure 1:
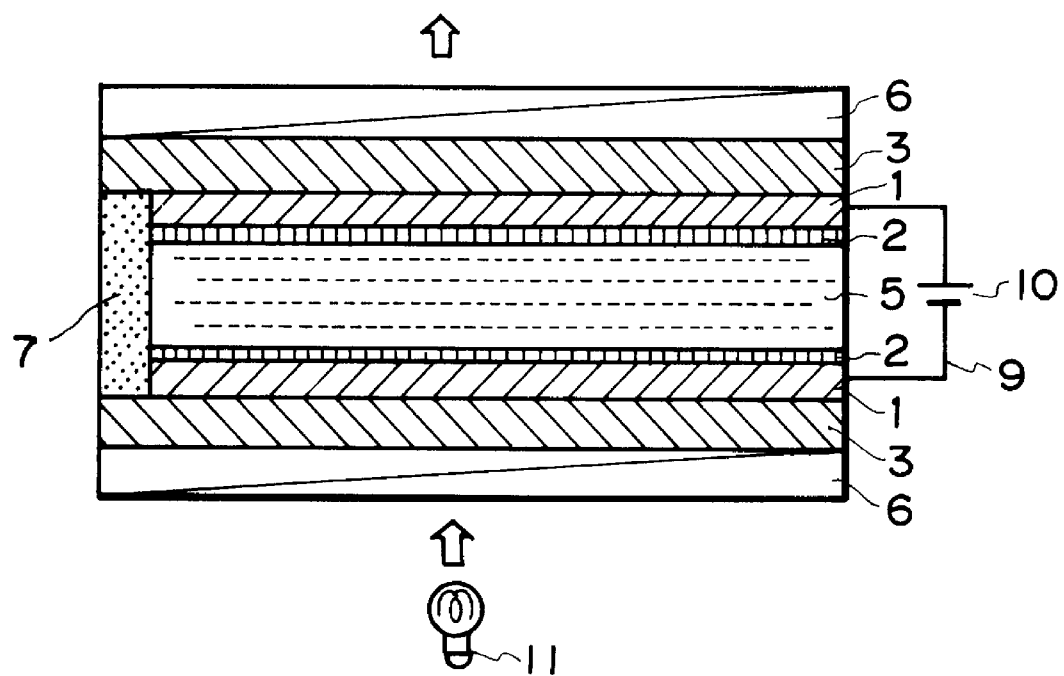
FIG. 1 is a sectional view of a liquid crystal device used in the invention.

In this way, the chiral smectic liquid crystal (5) used in an embodiment of the present invention, referring to FIG. 1, is caused to have a difference in Iso-SmA phase transition temperature between at the boundaries at the pair of substrates (3), so that the Iso-SmA phase transition thereof is caused to start from either one boundary of the two substrates (3). Furthermore, because of the characteristic of $0.96 \leq d_{min}/d_A$, preferably $0.99 \leq d_{min}/d_A$, it is possible to align a Ch-free liquid crystal with a good planar homogeneity in a layer normal direction, thereby providing a uniform alignment with an increased apparent tilt angle. As a result, it is possible to realize a chiral smectic liquid crystal device having a large brightness and a large contrast.

Figure 3:
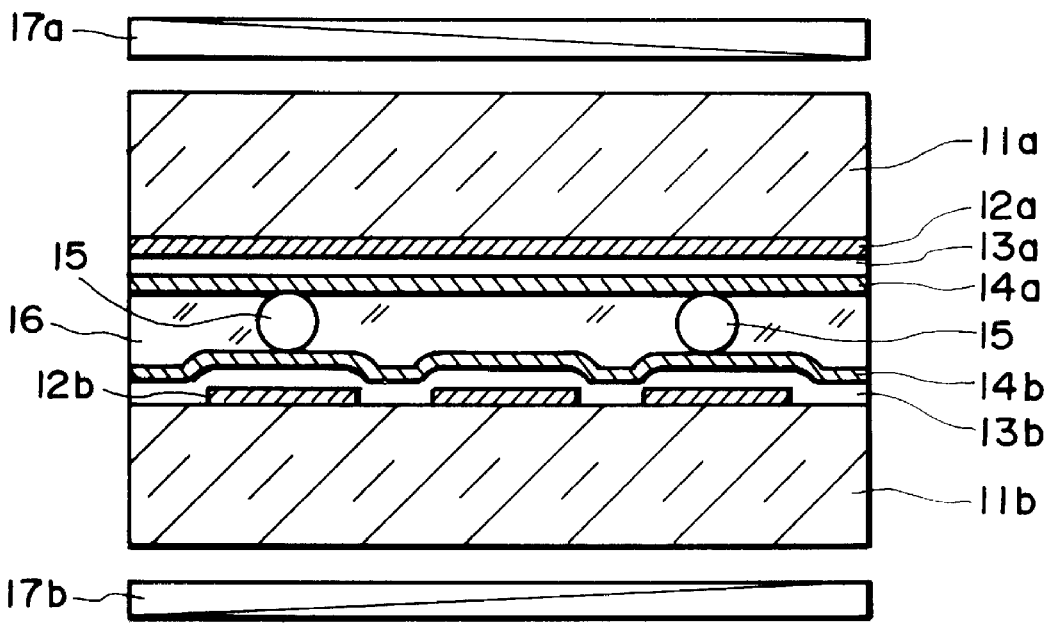
FIG. 3 is a schematic sectional view of ferroelectric liquid crystal device according to another embodiment of the present invention.

In another embodiment of the present invention, referring to FIG. 3, a smectic liquid crystal (16) is provided with a characteristic of $0.96 \leq d_{min}/d_A$, preferably $0.99 \leq d_{min}/d_A$, and either one of the substrates (11a and 11b) is provided with a uniaxial alignment film (14a and 14b), so that it is possible to realize an alignment state with a small layer inclination angle, if any, close to a bookshelf layer structure. More specifically, a smectic liquid crystal, even if it has no Ch phase, may be provided with a good planar homogeneity in alignment direction of smectic layer normals to provide a uniform alignment with an increased apparent tilt angle. As a result, the resultant liquid crystal device is provided with improve display characteristics inclusive of measured brightness and contrast and with almost no surface memory, thereby showing improved drive characteristics due to suppression of a fluctuation in threshold for switching between stable states.

Hereinbelow, the present invention will be described more specifically.

(FIRST EMBODIMENT)

FIG. 1 is a schematic sectional view of a ferroelectric liquid crystal device (cell) according to an embodiment of the present invention.

Referring to FIG. 1, the device includes opposing electrodes 1 each comprising a transparent conductor, such as $SnO_2$, $In_2O_3$ or ITO (indium tin oxide). At least one of the electrodes 1 is covered with a uniaxial alignment film 2 comprising an oblique vapor deposition layer, a rubbed organic polymer layer, an LB (Langmuir-Blodget) film, etc., for aligning a liquid crystal. It is possible to dispose an insulating layer of, e.g., SiN, SiO or TiSi. The electrode 1 and the alignment film 2 are disposed on a pair of substrates 3, between which a liquid crystal 5 capable of exhibiting ferroelectricity is disposed. The spacing between the substrates 3 is held by a spacer (not shown) disposed therebetween, and a periphery thereof is sealed to provide a cell structure, which is sandwiched between a pair of polarizers 6 disposed in cross nicols. The opposing electrodes 1 are supplied with drive signals via lead wires 9 by a voltage supply 10. The thus composed liquid crystal device may be driven to control the transmission of light from a light source 11 to form a display.

In this embodiment, the ferroelectric liquid crystal 5 comprises a chiral smectic liquid crystal in its chiral smectic phase, the chiral smectic liquid crystal having no Ch phase and having such a layer spacing-changing characteristic that it shows a first transition point where the layer spacing assumes a maximum $d_A$ in the vicinity of the SmA-SmC* phase transition temperature and a second transition point where the layer spacing assumes a minimum $d_{min}$ and begins to increase on further temperature decrease from the first transition point, $d_{min}$ and $d_A$ satisfy: $0.99 = d_{min}/d_A$.

In specific examples, the following FLC-A and TKF (trade name, a ferroelectric liquid crystal mixture available from Teikoku Kagaku K. K.) were used in Example 1 and Comparative Example 1.

| L.C. | Cryst. - SmC* - SmA - Iso. (°C.) | | | $d_{min}/d_A$ | Ps (nC/cm$^2$) | H (deg.) |
|---|---|---|---|---|---|---|
| FLC-A | −13.6 | 53.2 | 79.0 | 0.99 | 2.5 | 12.2 |
| TKF-8616 | −13 | 52 | 64 | 0.94 | 21 | 21.5 |
The above liquid crystal material FLC-A was a mixture of the following components in respectively indicated weight parts.
|  | wt. parts |
|---|---|
| 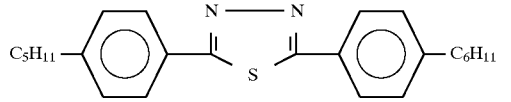 | 5 |
| 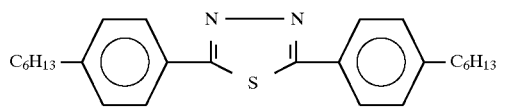 | 5 |
| 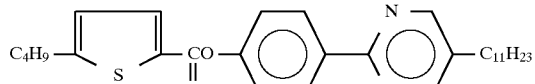 | 6.7 |
| 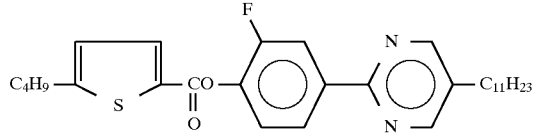 | 3.3 |
| 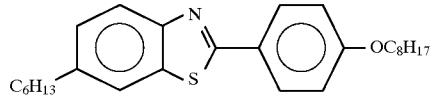 | 20 |
| 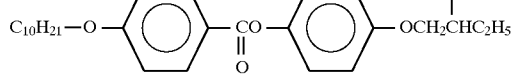 | 26 |
| 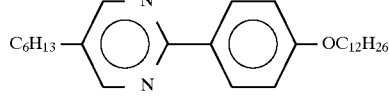 | 4 |
| 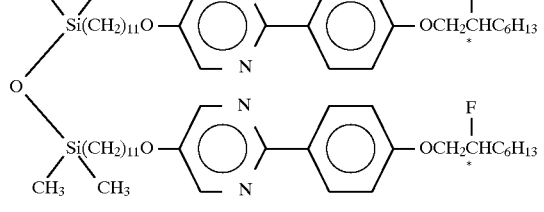 | 10 |
|  | 8 |
|  | 8 |

-continued

| | wt. parts |
|---|---|
| $C_9H_{19}$—⟨N,N-benzene⟩—$OC_8H_{17}$ | 4 |

In this embodiment, a pair of substrates 3 are provided with asymmetrical characters so as to provide a difference in Iso-SmA phase transition temperature in the liquid crystal 5 in contact therewith. This may for example be accomplished by changing the thickness of the transparent electrodes, disposing an insulating film on one side of the substrates 3, changing the thickness of the insulating film and using different types of insulating films on the two substrates.

The liquid crystal 5 in the above-constituted liquid crystal cell is caused to have a difference in Iso-SmA phase transition temperature at boundaries on the two substrates 3, so that the Iso-SmA phase transition is caused to start from one of the boundaries at the two substrates. Further, as a result of the feature of $0.96 \leq d_{min}/d_A$, more preferably $0.99 \leq d_{min}/d_A$, the liquid crystal 5 is provided with a good planar homogeneity in a layer normal direction even though it has no Ch phase, thus resulting in a uniform alignment with an increased apparent tilt angle. As a result, it becomes possible to realize a ferroelectric liquid crystal device having increased brightness and contrast as will be demonstrated in Experimental Examples described hereinafter.

Various parameters characterizing the liquid crystal device according to the present invention are based on values measured in the following manner.

<Phase transition temperature>

The phase transition temperatures of an objective liquid crystal cell having a pair of substrates having asymmetrical character at the respective substrate boundaries may be obtained by preparing the reference cells each having a pair of substrates of an identical character with that of either one or the other substrate of the objective cell and measuring the phase transition temperatures of the reference cells as representing the phase transition temperatures of the respective substrates of the objective cell.

The Iso-SmA phase transition temperature of a sample cell was measured by using a temperature controller ("Mettler FP-80") and a hot stage ("FP-82") to hold the sample cell for 5 min. at a temperature of ca. 10° C. in excess of the Iso-SmA phase transition temperature and then gradually cooling the cell at a rate of −1° C./min to find a temperature where the batonnets of SmA appears.

<Contrast> A sample cell is sandwiched between a pair of 90 degrees-cross nicol polarizers and is supplied with a pulse of one polarity having a sufficiently large amplitude for switching. Then, the 90 degrees-cross nicol polarizers are rotated to find an extinction position (darkest state) and measure an output of a photomultiplier receiving light transmitted through the cell to determine a dark state transmittance. Then, the cell is supplied with a pulse of an opposite polarity having a sufficiently large amplitude for switching and then the output of the photomultiplier receiving light transmitted through the cell is measured again to determine a bright state transmittance, thereby obtaining a contrast as a ratio between the bright state transmittance and the dark state transmittance. Incidentally, a reference transmittance of 0% is determined from the output of the photomultiplier in the light interrupting state, and a reference transmittance of 100% is determined from the output of the photomultiplier receiving light transmitted through parallel-nicol polarizers.

<Pretilt angle α>

The measurement was performed according to the crystal rotation method as described at Jpn. J. Appl. Phys. vol. 19 (1980), No. 10, Short Notes 2013.

More specifically, a pair of sample substrates were applied to each other so that the liquid crystal molecular inclinations at the two substrates were parallel and identical to each other to form a cell, which was then filled with a standard liquid crystal mixture assuming SmA phase in the temperature range of 10–55° C. obtained by mixing 80 wt. % of a ferroelectric liquid crystal ("CS-1014", mfd. by Chisso K. K.) with 20 wt. % of a compound represented by the following formula:

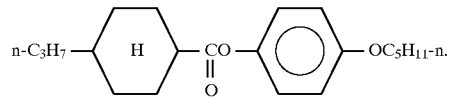

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle α, $$\sin 2\alpha = \frac{-2\sin\phi_x}{(n_o + n_e)1 - \sqrt{(\sin\phi_x/n_o)^2}}$$

wherein $n_o$ denotes the refractive index of ordinary ray, and $n_e$ denotes the refractive index of extraordinary ray.

<Layer spacing d and layer inclination angle δ>

The method used was basically similar to the method used by Clark and Largerwal (Japan Display '86, Sep. 30–Oct. 2, 1986, p.p. 456–458) or the method of Ohuchi et al (Japanese Journal of Applied Physics, 27 (5) (1988), p.p. 725–728). The measurement was performed by using a rotary anticathode-type X-ray diffraction apparatus (available from MAC Science) together with CuKα rays as analyzing rays. A sample cell was prepared by using 80 μm-thick glass sheets ("MICROSHEET", available from Corning Glass Works) as the substrates so as to minimize the X-ray absorption with the glass substrates, otherwise in a similar manner as the production of an objective liquid crystal cell.

For the measurement of a liquid crystal layer spacing d, a bulk liquid crystal was applied on a sample glass sheet and was subjected to 2θ/θ scanning in a similar manner as in an ordinary powder X-ray diffraction method. From a measured angle providing a peak of X-ray intensity, a value of d was calculated by the method disclosed in the above-described references. By repeating the above steps plural times at different temperatures, a temperature-dependence of layer spacing as shown in FIG. 2 was obtained.

On the other hand, for measurement of a layer inclination angle δ, a 1.5 μm-gap cell was prepared by using the above-mentioned 80 μm-thick glass sheets as the substrates and gradually cooled for alignment. Then, the X-ray detector was set at an angle 2θ for obtaining the layer spacing described above, and the above-prepared cell was subjected to θ-scanning. From the measured values, δ was calculated according to the method disclosed in the above-mentioned references.

Hereinbelow, there will be described some specific devices of Experimental Examples having the above-described characteristics and a device of Comparative Example 1.

EXPERIMENTAL EXAMPLE 1

Two 1.1 mm-thick glass substrates each provided with a ca. 150 nm-thick ITO film were provided, and one of them was coated with a 1.5 wt. %-solution of a polyimide precursor ("LQ1802", mfd. by Hitachi Kasei K. K.) in a 1/1-mixture of NMP/nBC by spin coating at 2000 rpm for 20 sec., followed by hot baking at 270° C. for ca. 1 hour to form a first alignment film in a thickness of 20 nm. The other substrate was coated with a 1.0 wt. % solution of a polyimide precursor ("LP64", mfd. by Toray K. K.) in a 2/1-mixture of NMP/nBC by spin coating at 2700 rpm for 20 sec., followed by hot baking at 200° C. for ca. 1 hour to form a second alignment film in a thickness of 10 nm. The second alignment film thus formed was then rubbed in one direction with a nylon yarn-plated cloth while the first alignment film was not rubbed. Thereafter, alumina spacer beads of 1.5 μm in average diameter were dispersed on one substrate, and the other substrate was superposed thereon to form a blank cell.

The cell was then filled with the above-mentioned liquid crystal material FLC-A in isotropic phase by vacuum injection and then gradually cooled at a rate of 0.5° C./min to room temperature, to form a liquid crystal cell. (Incidentally, the liquid crystal material had an alignment characteristic such that it could be homogeneously aligned even under a rapid cooling.)

The liquid crystal cell was sandwiched between a pair of 90 degrees-cross nicol polarizers, supplied with a pulse of 30 volts and 50 μsec and then the 90 degrees-cross nicol polarizers were set to an extinction position (darkest state) to measure a transmittance in this state by a photomultiplier. Then, the cell was supplied with an opposite polarity pulse of −30 volts and 50 μsec. Then, the transmittance in this state (bright state) was measured by the photomultiplier. Thereafter, the 90 degrees-cross nicol polarizer was rotated at an angle 2θa to find an extinction position again, thereby obtaining an apparent tilt angle θa. As a result, the tilt angle θa was measured to be ca. 12 degrees, the transmittance in the darkest state was 0.15% and the transmittance in the bright state was 15%, whereby the contrast ratio was 100:1.

Separately, a cell for phase transition temperature measurement was prepared in the same manner as above except that the non-rubbed first alignment film ("LQ1802") was formed on both substrates and subjected to the measurement of phase transition temperature in the above-described manner whereby the Iso-SmA phase transition temperature was found to be 78.0° C. On further cooling, the alignment in SmC* phase was in a random alignment state.

Another cell for phase transition temperature measurement was also prepared in the same manner as above except that the rubbed second alignment film ("LP64") was formed on both substrates, and the two substrates were superposed on each other so that their rubbing directions were parallel and identical to each other. The measured Iso-SmA phase transition temperature was 79.8° C. On further cooling, the resultant alignment state in SmC* phase was accompanied with streak-like defects.

As is understood from the above results, a homogeneous alignment was realized by using a pair of substrates prepared in an asymmetrical manner so as to provide an Iso-SmA phase transition temperature difference of 1.8° C. between at both boundaries. Incidentally, it was also found that the Iso-SmA phase temperature difference might generally be at least 0.5° C. so as to provide a homogeneous alignment without being substantially affected by a gradual cooling speed.

Further, a cell for pretilt angle measurement was prepared in a similar manner as above except that a pair of substrates each provided with the non-rubbed first alignment film ("LQ1802") were superposed with each other with a gap of 20 μm therebetween. The pretilt angle measurement was performed in the above-described manner whereby the liquid crystal was aligned in a homeotropic alignment state showing no extinction position and the pretilt angle was measured to be ca. 90 degrees.

Further, another cell for pretilt angle measurement was prepared in a similar manner as above except that both substrates were provided with the rubbed second alignment film and superposed with each other so that their rubbed directions were parallel and opposite to each other. As a result of measurement by the crystal rotation method in the above-described manner, the cell showed a pretilt angle of ca. 2 degrees.

EXPERIMENTAL EXAMPLE 2

Two 1.1 mm-thick glass substrates each provided with a ca. 150 nm-thick ITO film were respectively coated with a 1.5 wt. % solution of a polyimide precursor ("LQ1802" mfd. by Hitachi Kasei K. K.) in a 1/1-mixture of NMP/nBC by spin coating at 2000 rpm for 20 sec., followed by hot baking at 270° C. for ca. 1 hour to form a 20 nm-thick alignment film. Then, the alignment film on one substrate was subjected to rubbing in one direction with a rubbing roller covered with a nylon yarn-planted cloth under the conditions of a rubbing roller pressing depth of 0.4 mm, a rotation speed of 1000 rpm and a substrate feed rate of 20 mm/sec to form a first-type substrate, and the alignment film on the other substrate was subjected to rubbing in a similar manner but under the conditions of a pressing depth of 0.25 mm, a rotation speed of 1000 rpm and a substrate feed rate of 50 mm/sec. Thereafter, alumina spacer beads of 1.5 μm in average diameter were dispersed on one substrate, and the other substrate was superposed thereon so that their rubbing directions were parallel and identical to each other, thereby to form a blank cell.

The cell was then filled with the above-mentioned liquid crystal material FLC-A in isotropic phase by vacuum injection and then gradually cooled at a rate of 1.0° C./min to room temperature, to form a liquid crystal cell.

The liquid crystal cell was sandwiched between a pair of 90 degrees-cross nicol polarizers and subjected to measurement of a contrast and an apparent tilt angle in the same manner as in Experimental Example 1, whereby the tilt angle θa was ca. 11.5 degrees, the transmittance in the darkest state was 0.16% and the transmittance in the bright state was 14%, thus providing a contrast ratio of 88:1.

Separately, a cell for phase transition temperature measurement was prepared in the same manner as above except for using two sheets of the first-type substrate, whereby the liquid crystal in the cell showed an Iso-SmA phase transition temperature of 78.5° C. and a random alignment in SmC* phase. Another cell for phase temperature measurement was prepared in the same manner as above except for using two sheets of the second-type substrate, whereby the liquid crystal in the cell showed an Iso-SmA phase transition temperature of 79.5° C., and a defective uniform alignment state in SmC* phase.

Further, a cell for pretilt angle measurement was prepared in a similar manner as above except that two sheets of the first-type substrate were superposed with each other with a spacing of 20 μm therebetween so that their rubbing directions were parallel and opposite to each other and subjected to measurement of the pretilt angle in the above-described manner, whereby the pretilt angle was measured to be 58 degrees. Similarly, another cell for pretilt angle measurement was prepared in a similar manner by using two sheets of the second-type substrate whereby the pretilt angle was measured to be ca. 6 degrees.

EXPERIMENTAL EXAMPLE 3

Two 1.1 mm-thick glass substrates each provided with a ca. 100 nm-thick ITO film were provided, and one of them was coated with a 1.0 wt. % solution of a polyimide precursor ("LP64", mfd. by Toray K. K.) in a 2/1 mixture of NMP/nBC by spin coating at 2700 rpm for 20 sec., followed by hot baking at 200° C. for ca. 1 hour, to form a 10 nm-thick alignment film. The other substrate was coated with a 30 nm-thick alignment film of a silane coupling agent formed by spin coating. The alignment films on the two substrates were respectively subjected to rubbing in one direction with a nylon yarn-planted cloth, thereby providing a first-type and a second-type substrate, respectively. Then, alumina spacer beads of 1.5 μm in average diameter were dispersed on one of the substrates, and the other substrate was superposed thereon so that their rubbing directions were parallel and identical to each other to form a blank cell. The cell was then filled with the above-mentioned FLC-A in isotropic phase and gradually cooled at a rate of 1.0 ° C./min to room temperature, thereby to form a liquid crystal cell showing a homogeneous alignment. However, when the liquid crystal cell was reheated to 90° C. and then cooled rapidly to room temperature, the homogeneity of alignment was impaired.

As a result of the measurement in the same manner as in Experimental Example 1, the liquid crystal cell showed a contrast ratio of 85:1.

Separately, a cell for phase transition temperature measurement was prepared in the same manner as above except for using two sheets of the first-type substrate, whereby the liquid crystal in the cell showed an Iso-SmA phase transition temperature of 79.7 degrees and an alignment with streak defects in SmC* phase. Another cell was prepared by using two sheets of the second-type substrate, whereby the liquid crystal in the cell showed an Iso-SmA phase transition temperature of 79.5° C. and a random alignment state in SmC* phase.

Further, a cell for pretilt angle measurement was prepared in a similar manner as above except that two sheets of the first-type substrate were superposed with each other with a spacing of 20 μm therebetween so that their rubbing directions were parallel and opposite to each other and subjected to measurement of the pretilt angle in the above-described manner, whereby the pretilt angle was measured to be 1.8 degrees. Similarly, another cell for pretilt angle measurement was prepared in a similar manner by using two sheets of the second-type substrate whereby the pretilt angle was measured to be ca. 0.5 degrees.

COMPARATIVE EXAMPLE 1

A blank cell was prepared in the same manner as in Experimental Example 3 and filled with the above-mentioned liquid crystal material TKF-8616 in isotropic phase and then gradually cooled to room temperature at a rate of 1.0° C./min, to form a liquid crystal cell.

The liquid crystal cell was sandwiched between a pair of polarizers and subjected to measurement of a contrast and an apparent tilt angle in the same manner as in Experimental Example 1, whereby the tilt angle θa was ca. 7 degrees, the transmittance in the darkest state was 1.8% and the transmittance in the bright state was 11%, thus providing a contrast ratio of 6:1. The alignment state was not a uniform alignment.

As described above, according to this embodiment of the liquid crystal device of the present invention, a ferroelectric liquid crystal having no Ch phase is aligned with good planar homogeneity in direction of smectic layer normals and in a uniform alignment showing a large apparent tilt angle. Accordingly, a ferroelectric liquid crystal device exhibiting good display characteristics inclusive of large brightness and contrast can be realized.

(SECOND EMBODIMENT)

FIG. 3 is a schematic sectional view of a ferroelectric liquid crystal device (cell) according to another embodiment of the present invention.

Referring to FIG. 3, the device includes a pair of substrates 11a and 11b respectively having thereon transparent electrodes 12a and 12b of $In_2O_3$, ITO (indium tin oxide), etc., short circuit-preventing layers 13a and 13b and alignment films 14a and 14b. The spacing between the alignment films 14a and 14b is held by spacer beads 15. Between the alignment films 14a and 14b, a chiral smectic liquid crystal 16 is disposed. A cell structure thus formed is sandwiched between a pair of polarizers 17a and 17b disposed outside the substrates 11a and 11b.

The alignment films 14a and 14b in combination function to uniaxially aligning the chiral smectic liquid crystal 16. Among them, the alignment film 14a on one substrate 11a is subjected to a uniaxial aligning treatment and is characterized by comprising a resin having a glass transition point of at least 200° C. or a polyimide. The alignment film 14b on the other substrate 11b is an alignment film which alone would provide a random alignment of the liquid crystal.

The chiral smectic liquid crystal 16 comprises a Ch-free liquid crystal in a chiral smectic phase such as chiral smectic C phase (SmC*), H phase (SmH*), I phase (SmI *), K phase (SmK*) or G phase (SmG*).

The ferroelectric liquid crystal 16 used in this embodiment may have such a layer spacing-changing characteristic that it shows a first transition point where the layer spacing assumes a maximum $d_A$ in the vicinity of the SmA-SmC* phase transition temperature and a second transition point where the layer spacing assumes a minimum $d_{min}$ and begins to increase on further temperature decrease from the first transition point, $d_{min}$ and $d_A$ satisfy: $0.96 \leq d_{min}/d_A$, preferably $0.99 \leq d_{min}/d_A$.

In specific examples according to this embodiment, the same liquid crystal material FLC-A used in the above-mentioned First Embodiment was used.

The above-mentioned liquid crystal device can be supplied with an AC voltage application treatment so as to provide an increased apparent tilt angle between the bistable states.

In the liquid crystal device shown in FIG. 3, the chiral smectic liquid crystal 16 satisfies the layer spacing-changing characteristic satisfying $0.96 \leq d_{min}/d_A$, preferably $0.99 \leq d_{min}/d_A$, and the alignment films 14a and 14b satisfy the above-mentioned characteristic, an alignment state providing a small layer inclination angle and close to a bookshelf layer structure can be realized. In other words, the chiral smectic liquid crystal 16, though not having Ch phase, may have a good planar homogeneity or uniformity in alignment of smectic layer normals (in other words, the liquid crystal is aligned in smectic layers which provide an identical layer normal direction at any parts over the planar extension of the device) and result in a uniform alignment with an increased apparent tilt angle. As a result, it becomes possible to realize a ferroelectric liquid crystal device which has improved display characteristics inclusive of increased brightness and contrast and improved drive characteristics because of substantial obviation of surface memory and suppressed fluctuation in switching thresholds between the two stable states, as will be demonstrated in Experimental Examples described hereinafter.

Several parameters additionally characterizing the liquid crystal device according to this embodiment of the present invention are based on values measured in the following manner.

<True tilt angle $\textcircled{H}$>

Bipolar pulses having a sufficient magnitude (e.g., AC pulses of 10 volts and 100 Hz in case where a threshold for a single pulse is 10 volts and 50 $\mu$sec) are applied to a sample liquid crystal device sandwiched between right angle-cross nicol polarizers, and the cross nicol polarizers are rotated to find two extinction positions corresponding to the two switched states while monitoring the optical responses from the device by a photomultiplier. A half of the measured angle of rotation of the cross nicol polarizers between the two extinction positions is taken as a true tilt angle $\textcircled{H}$.

<Surface memory (Standing monostability)>

A matrix display panel is formed by using a pair of substrates each provided with plural stripe electrodes, applying the substrates to each other so as to form a plurality of pixels each at an intersection of the stripe electrodes on the pair of substrates including two pixels a and b, and disposing a liquid crystal between the substrates. In an initial stage, the pixels a and b are switched from a stable state A to a stable state B and vice versa to measure the respective thresholds $V_{I(A-B)}$ and $V_{I(B-A)}$, which denote the thresholds for switching from the state A to state B and from the state B to state A respectively, thereby also confirming the bistability in this stage. Thereafter, the pixels a and b are placed in the stable states A and B, respectively, and held in the respective states for 3 days at 30° C. Then, the thresholds for switching between the two stable states A and B are measured for the pixels a and b, separately, i.e., $V_{A(A-B)}$ as a threshold for switching from A to B after standing at A, and $V_{I(A-B)}$ as a threshold for switching from A–B in the intial stage $V_{B(A-B)}$ as a threshold for switching from A to B after standing at B, $V_{B(B-A)}$ as a threshold for switching from B to A after standing at B and $V_{A(B-A)}$ as threshold for switching from B to A after standing at A. Parameters $P_{A-B}$ and $P_{B-A}$ for evaluation of surface memory are calculated from the above measured values as follows:

$$P_{A-B} = \{V_{A(A-B)} - V_{B(A-B)}\}/V_{I(A-B)}$$

$$P_{B-A} = \{V_{B(B-A)} - V_{A(B-A)}\}/V_{I(B-A)}$$

Both parameters $P_{A-B}$ and $P_{B-A}$ indicate a smaller degree of surface memory if they are smaller, and vice versa.

EXPERIMENTAL EXAMPLE 4

Two 1.1 mm-thick glass substrates each provided with a 150 nm-thick ITO film were provided, and one of the substrates was coated with a 4 wt. % solution of a polyamic acid in NMP (N-methylpyrrolidone), followed by baking at 270° C. to form a 20 nm-thick alignment film of the following polyimide A.

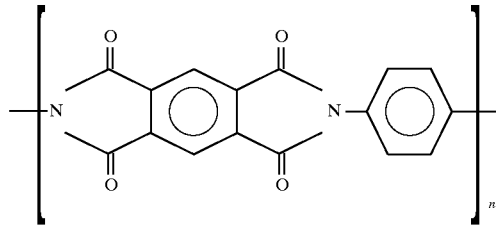

The polyimide alignment film was rubbed in one direction with a nylon rubbing cloth under the conditions of a pressing depth of 0.4 mm, a roller rotation speed of 1000 rpm, and a substrate feed rate of 10 mm/sec., to provide a first-type substrate.

The other substrate was coated a 3 nm-thick silane coupling agent layer by spin coating, and rubbed in one direction with a nylon rubbing cloth under the conditions of a pressing depth of 0.2 mm, a roller rotation speed of 500 rpm and a substrate feed rate of 50 mm/sec, thereby to obtain a second-type substrate.

The two substrates were superposed with each other with 3 $\mu$m-dia. silica spacer beads disposed therebetween so that their rubbing directions were parallel and opposite to each other to form a blank cell, which was then filled with the liquid crystal material FLC-A in isotropic phase and cooled to 30° C., to form a liquid crystal cell. The alignment state and device performances of the cell were evaluated. As a result, the cell exhibited a good planar homogeneity in smectic layer normal direction as shown in FIG. 4 (a polarizing microscopic photograph at a magnification of 250). The cell further showed a contrast of 50 and a response time of 40 $\mu$sec (by application of bipolar pulses of±15 volts).

Then, the surface memory (standing monostability) was evaluated according to the above-described manner by using single pulses in a pulse width ($\Delta$T) of 40 $\mu$sec, whereby the results were $P_{A-B}$=0.06 and $P_{B-A}$=0.05, thus showing substantially no surface memory.

Separately, a cell was prepared in a similar manner as above by using two sheets of the second-type substrate, whereby the FLC-A in the cell showed a random alignment.

EXPERIMENTAL EXAMPLE 5

A liquid crystal cell was prepared and evaluated in the same manner as in Experimental Example 4 except that the second-type substrate coated with a silane coupling agent was not subjected to rubbing. As a result, the cell showed a good planar homogeneity in smectic layer normal direction as shown in FIG. 5 (a polarizing microscopic photograph at a magnification of 250). The contrast was 50 and the response time was 40 $\mu$sec.

Then, the surface memory (standing monostability) was evaluated according to the above-described manner by using single pulses in a pulse width (ΔT) of 40 μsec, whereby the results were $P_{A-B}$=0.05 and $P_{B-A}$=0.05, thus showing substantially no surface memory.

EXPERIMENTAL EXAMPLE 6

A liquid crystal cell was prepared and evaluated in the same manner as in Experimental Example 4 except that the second-type substrate was prepared by coating with the polyimide A instead of the silane coupling agent and not performing the rubbing. As a result, the cell showed a good planar homogeneity in smectic layer normal direction as shown in FIG. 6 (a polarizing microscopic photograph at a magnification of 250). The contrast was 45 and the response time was 38 μsec.

Then, the surface memory (standing monostability) was evaluated according to the above-described manner by using single pulses in a pulse width (ΔT) of 40 μsec, whereby the results were $P_{A-B}$=0.06 and $P_{B-A}$=0.03, thus showing substantially no surface memory.

EXPERIMENTAL EXAMPLE 7

A liquid crystal cell was prepared and evaluated in the same manner as in Experimental Example 4 except that the second-type substrate was prepared by coating with polyvinyl alcohol (PVA) instead of the silane coupling agent and not performing the rubbing. As a result, the cell showed a good planar homogeneity in smectic layer normal direction as shown in FIG. 7 (a polarizing microscopic photograph at a magnification of 250). The contrast was 48 and the response time was 41 μsec.

Then, the surface memory (standing monostability) was evaluated according to the above-described manner by using single pulses in a pulse width (ΔT) of 40 μsec, whereby the results were $P_{A-B}$=0.06 and $P_{B-A}$=0.06, thus showing substantially no surface memory.

COMPARATIVE EXAMPLE 2

Figure 8:
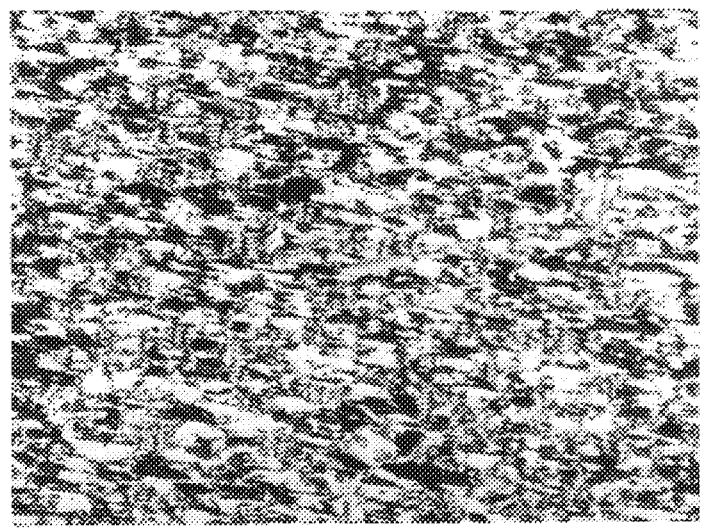

A liquid crystal cell was prepared and evaluated in the same manner as in Experimental Example 7 except that the polyimide A alignment film for the first substrate was not rubbed. As a result, the cell showed poor homogeneity in smectic layer normal direction as shown in FIG. 8 (a polarizing microscopic photograph at a magnification of 250). Further, light leakage in the dark state was noticeable, and only an areal percentage of 20% could be switched.

COMPARATIVE EXAMPLE 3

Figure 9:
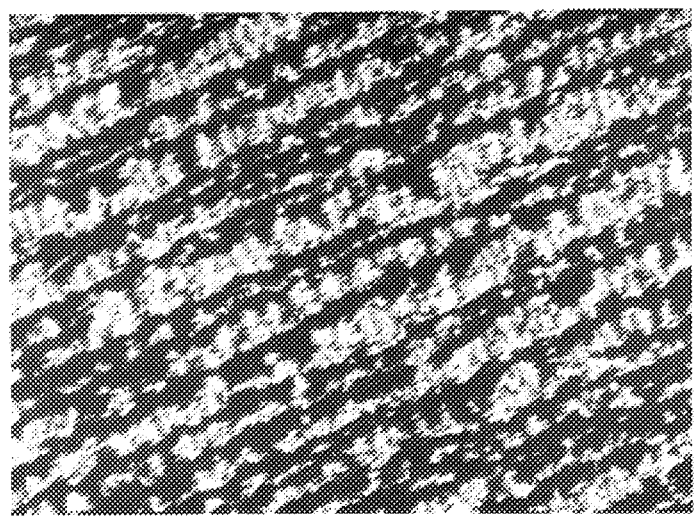

A liquid crystal cell was prepared and evaluated in the same manner as in Experimental Example 7 except that both substrates were prepared by coating with PVA followed by rubbing. As a result, the cell showed poor homogeneity in smectic layer normal direction as shown in FIG. 9 (a polarizing microscopic photograph at a magnification of 250). Further, light leakage in the dark state was noticeable, and only an areal percentage of 30% could be switched.

COMPARATIVE EXAMPLE 4

A liquid crystal cell was prepared and evaluated in the same manner as in Experimental Example 7 except that the PVA alignment film for the second substrate was rubbed. As a result, the cell showed poor homogeneity in smectic layer normal direction as shown in FIG. 10 (a polarizing microscopic photograph at a magnification of 250). Further, light leakage in the dark state was noticeable, and only an areal percentage of 20% could be switched.

EXPERIMENTAL EXAMPLE 8

A liquid crystal cell was prepared and evaluated in the same manner as in Experimental Example 4 except that the second-type substrate was prepared by coating with 12-nylon (glass transition point=37° C.) instead of the silane coupling agent. As a result, the cell showed a good planar homogeneity in a layer normal direction as shown in FIG. 11 (a polarizing microscopic photograph at a magnification of 250). The contrast was 50 and the response time was 45 μsec.

Then, the surface memory (standing monostability) was evaluated according to the above-described manner by using single pulses in a pulse width (ΔT) of 40 μsec, whereby the results were $P_{A-B}$0.32 and $P_{B-A}$=0.27, thus showing an acceptable level of surface memory.

As described above, according to this embodiment of the chiral smectic liquid crystal device of the present invention, a chiral smectic liquid crystal having no Ch phase is aligned with good planar homogeneity with respect to smectic layer normal direction and in a uniform alignment showing a large apparent tilt angle. As a result, it is possible to provide a chiral smectic liquid crystal device exhibiting improved display characteristics including increased brightness and contrast and improved drive characteristics with substantially no surface memory and suppressed change in threshold for switching between the two stable states. Thus, according to the present invention, it is possible to provide a highly reliable liquid crystal device with excellent display characteristics and drive characteristics.

EXPERIMENTAL EXAMPLE 9

Figure 12:
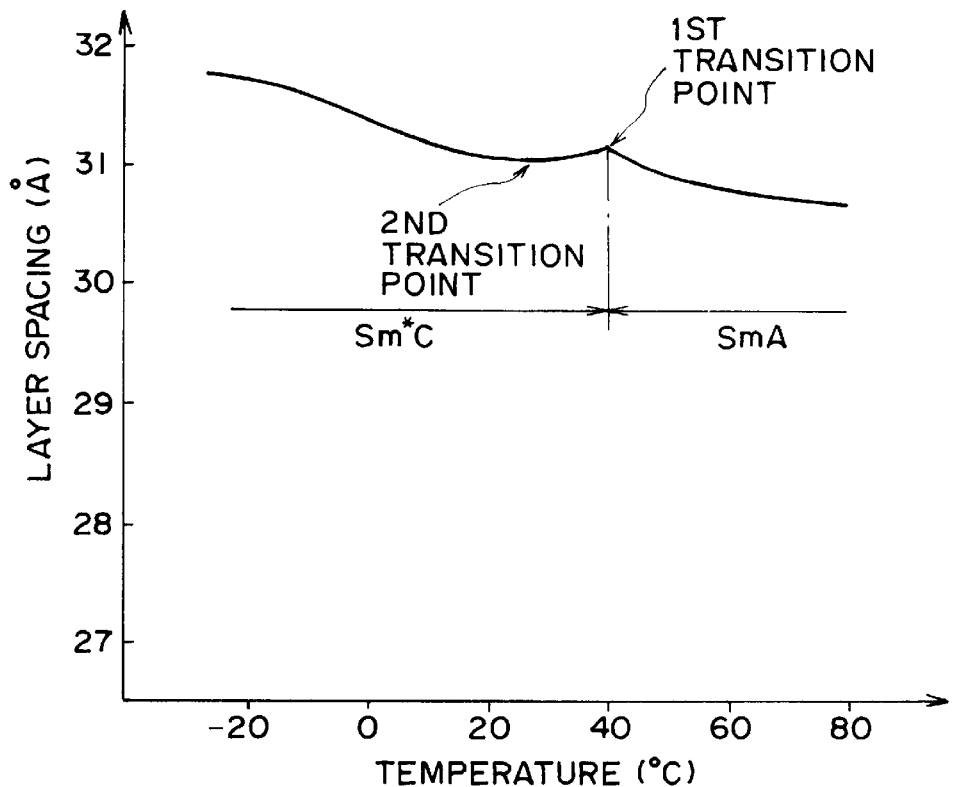
FIGS. 12 and 13 are graphs showing temperature-dependence of layer spacing of liquid crystal compositions used in an Example and a Comparative Example, respectively.
Figure 13:
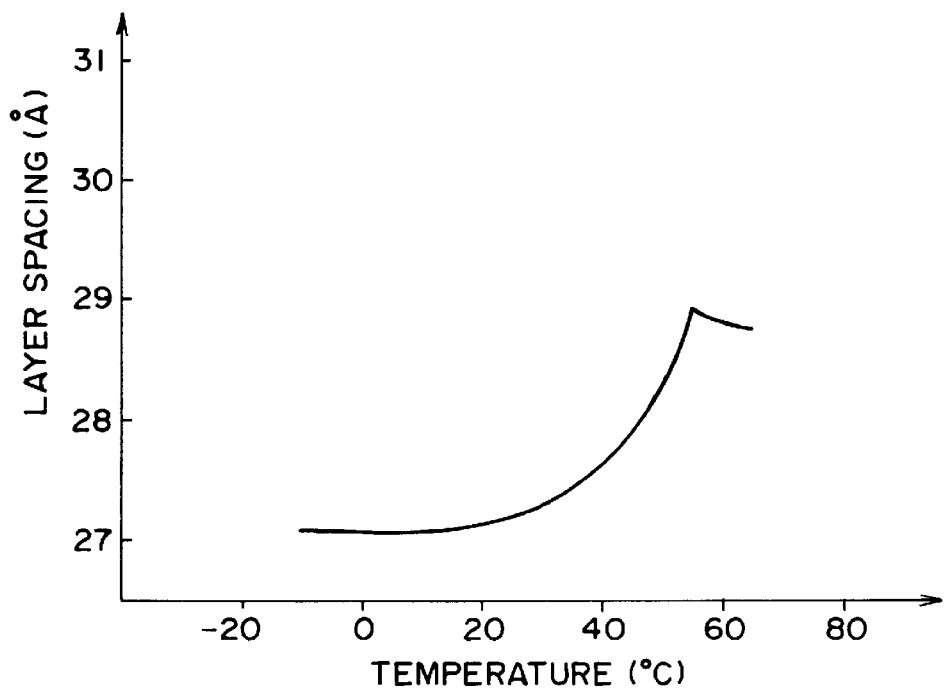

FIG. 12 is a graph showing a temperature-dependent layer spacing-changing characteristic of the liquid crystal material FLC-A used in the above-mentioned Experimental Examples, satisfying $d_{min}/d_A \geq 0.96$. FIG. 13 is a graph showing the liquid crystal material TKF-8616 used in Comparative Example 1, not satisfying $d_{min}/d_A \geq 0.96$.

In this Experimental Example 9, 10 liquid crystal compositions having varying values of $d_{min}/d_A$ were prepared by changing the amount of the following dimer-type compound in the liquid crystal mixture FLC-A described above:

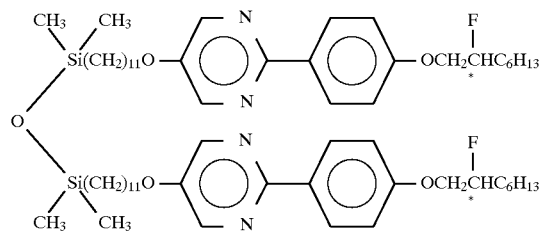

Then, 10 sample cells were prepared in the same manner as in the above Experimental Example 4 except for using the above-prepared liquid crystal compositions. The parameters characterizing the sample cells and the results of evaluation thereof are summarized in Table 1 appearing hereinafter.

The results were evaluated according to the following standards:

A: Particularly excellent.

B: Better than the conventional level.

C: A minimum acceptable level for a device.

In view of the evaluation results shown in Table 1, it is to be noted that some sample cells showed excellent results with respect to both items of "surface memory" and "liquid crystal molecular movement" in a planar direction, whereas it has been delieved heretofore that these items are contrary by nature and it is difficult to satisfy these performances in combination. However, these performances could be satisfied in combination by some sample cells because of the control of $d_{min}/d_A$ in a prescribed range and the asymmetrical characters of the pair of substrates as shown in Table 1.

TABLE 1

| Sample cell | Amount of dimer-type compound (wt. parts) | Evaluation | | | $d_{min}/d_A$ |
| --- | --- | --- | --- | --- | --- |
| | | Planar homogeneity of alignment | Surface memory | LC molecular movement | |
| 1 | 12 | A | A | A | 0.996 |
| 2 | 11.5 | A | A | A | 0.993 |
| 3 | 11 | A | A | A | 0.991 |
| 4 | 9.5 | A | A | A | 0.990 |
| 5 | 6.8 | B | B | B | 0.986 |
| 6 | 6.2 | B | B | B | 0.974 |
| 7 | 5 | B | B | B | 0.963 |
| 8 | 4 | B | B | B | 0.960 |
| 9 | 2 | B | C | B | 0.940 |
| 10 | 1 | B | C | B | 0.926 |

What is claimed is:

1. A liquid crystal device, comprising:

a pair of substrates and a liquid crystal disposed therebetween, wherein the liquid crystal has a phase transition series not showing cholesteric phase and is placed in a bistable chiral smectic phase, and the pair of substrates have been subjected to asymmetrical aligning treatments;

said liquid crystal having a layer spacing-changing characteristic providing a layer spacing $d_A$ at a first transition point where the layer spacing of the liquid crystal begins to decrease upon temperature decrease in the vicinity of a transition temperature from SmA phase to SmC* phase and a layer spacing $d_{min}$ at a second transition point where the layer spacing of the liquid crystal begins to increase upon further temperature decrease from the first transition point, wherein $0.96 \leq d_{min}/d_A$.

2. A liquid crystal device according to claim 1, wherein $d_{min}$ and $d_A$ satisfy $0.99 \leq d_{min}/d_A$.

3. A liquid crystal device according to claim 1, wherein the pair of substrates are provided with different alignment films.

4. A liquid crystal device according to claim 3, wherein said different alignment films provide different pretilt angles.

5. A liquid crystal device according to any one of claims 1, 2, 3 and 4, wherein the pair of substrates are provided with different surface states such that, when one of said different surface states is provided to both substrates of a second liquid crystal device having an otherwise identical structure, the resultant two devices show Iso-SmA phase transition temperatures which differ from each other by at least 0.5° C.

6. A liquid crystal device according to claim 1, wherein either one of the pair of substrates is provided with an alignment film for uniaxially aligning the liquid crystal, the alignment film having a glass transition point of at least 200° C.

7. A liquid crystal device according to claim 6, wherein $d_{min}$ and $d_A$ satisfy $0.99 \leq d_{min}/d_A$.

8. A liquid crystal device according to claim 1, wherein either one of the pair of substrates is provided with an alignment film for uniaxially aligning the liquid crystal, the alignment film comprising a polyimide.

9. A liquid crystal device according to claim 8, wherein $d_{min}$ and $d_A$ satisfy $0.99 \leq d_{min}/d_A$.

10. A liquid crystal device according to claim 1, wherein one of the pair of substrates is provided with a uniaxial alignment film having a glass transition point of at least 200° C., and the other of the pair of substrates is provided with an alignment film which alone would provide a random alignment of the liquid crystal.

11. A liquid crystal device according to claim 10, wherein $d_{min}$ and $d_A$ satisfy $0.99 \leq d_{min/dA}$.

12. A liquid crystal device according to claim 1, wherein one of the pair of substrates is provided with a uniaxial alignment film comprising a polyimide, and the other of the pair of substrates is provided with an alignment film which alone would provide a random alignment of the liquid crystal.

13. A liquid crystal device according to claim 12, wherein $d_{min}$ and $d_A$ satisfy $0.99 \leq d_{min}/d_A$.

14. A liquid crystal device according to claim 1, wherein said liquid crystal is in a chiral smectic phase having a bookshelf structure.

* * * * *

UNITED STATES PATENT AND TRADEMARK OFFICE
CERTIFICATE OF CORRECTION

PATENT NO. : 5,825,447
DATED : October 20, 1998
INVENTOR(S) : Yukio Hanyu, et al.

It is certified that error appears in the above-identified patent and that said Letters Patent is hereby corrected as shown below:

Title page,
Item [54] Title, "#16" should be deleted.
Item [75] Inventors, "Hiratasuka;" should read -- Hiratsuka --.

Column 1,
Line 5, "#16" should be deleted;
Line 62, "angle a" should read -- angled --;
Line 64, "out study," should read -- our study, --; and
Line 65, "known" should read -- known to be --.

Column 2,
Line 54, "the" should be deleted.

Column 3,
Line 53, "FIG. 4" should read -- FIGS. 4 --.

Column 4,
Line 9, "in direction" should read -- in the direction --;
Line 50, "tion." should read -- tion is obtained. --.

Column 5,
Line 66, "between at the" should read -- between the --.

Column 6,
Line 21, "improve" should read -- improved --;
Line 62, "$0.99 = d_{min}/d_A$." should read -- $0.99 \leq d_{min}/d_A$. --.

UNITED STATES PATENT AND TRADEMARK OFFICE
CERTIFICATE OF CORRECTION

PATENT NO. : 5,825,447
DATED : October 20, 1998
INVENTOR(S) : Yukio Hanyu, et al.

It is certified that error appears in the above-identified patent and that said Letters Patent is hereby corrected as shown below:

Column 7,
Table, "

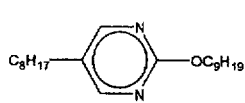     8

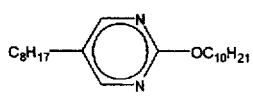     8

" should read

--  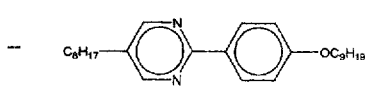     8

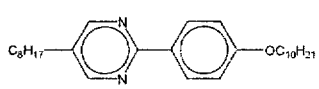     8     --

Column 9
Table, "  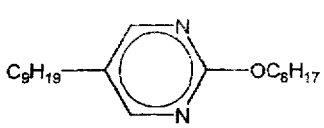    4  "

should read

--  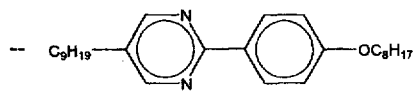    4   --

Line 51, "appears." should read -- appear. --;
Line 52, "<Contrast> A" should read -- <Contrast> ¶ A --.

Column 10,
Line 16, "vol. 19" should read -- vol. 119 --;
Line 51, "$(n_o+n_e)1-\sqrt{(\sin\Phi_x/n_o)^2}$" should read  $--(n_o+n_e)\sqrt{1-(\sin\Phi_x/n_o)^2}$ --;

Line 58, "et al" should read -- et al. --.

UNITED STATES PATENT AND TRADEMARK OFFICE
CERTIFICATE OF CORRECTION

PATENT NO. : 5,825,447
DATED : October 20, 1998
INVENTOR(S) : Yukio Hanyu, et al.

It is certified that error appears in the above-identified patent and that said Letters Patent is hereby corrected as shown below:

Column 12,
Line 16, "at" should be deleted;
Line 17, "both" should be deleted.

Column 14,
Line 50, "aligning" should read -- align --.

Column 15,
Line 37, "in case" should read -- in a case --;
Line 56, "A respectively," should read -- A, respectively, --;
Line 63, "stage" should read -- stage, --;
Line 66, "threshold" should read -- a threshold --.

Column 16,
Line 32, "coated a" should read -- coated with a --.

Column 18,
Line 14, "$P_{A-B}0.32$" should read -- $P_{A-B}=0.32$ --;
Line 67, "delieved" should read -- believed --.

Signed and Sealed this

Eighteenth Day of September, 2001

*Attest:*

NICHOLAS P. GODICI
*Attesting Officer*     Acting Director of the United States Patent and Trademark Office